United States Patent [19]

Nishimoto

[11] Patent Number: 4,564,267
[45] Date of Patent: Jan. 14, 1986

[54] VARIABLE-FOCAL-LENGTH LENS

[75] Inventor: Yoshifumi Nishimoto, Machida, Japan

[73] Assignee: Canon Kabushiki Kaisha, Tokyo, Japan

[21] Appl. No.: 453,161

[22] Filed: Dec. 27, 1982

[30] Foreign Application Priority Data

Jan. 7, 1982 [JP] Japan .................... 57-1495

[51] Int. Cl.$^4$ ............................................. G02B 1/29
[52] U.S. Cl. .................................................... 350/379
[58] Field of Search .............. 350/347 E, 347 V, 356, 350/379, 384, 387–390, 393, 411, 413, 403; 354/400

[56] References Cited

U.S. PATENT DOCUMENTS

| 3,167,607 | 1/1965 | Marks et al. | 350/379 |
| 3,520,592 | 7/1970 | Leib et al. | 350/379 |
| 3,758,201 | 9/1973 | MacNeille | 350/403 |
| 4,037,929 | 7/1977 | Bricot et al. | 350/347 V |
| 4,190,330 | 2/1980 | Berreman | 350/347 R |

FOREIGN PATENT DOCUMENTS

| 1191980 | 4/1965 | Fed. Rep. of Germany | 350/413 |
| 73748 | 6/1977 | Japan | 350/393 |
| 505980 | 7/1977 | U.S.S.R. | 350/411 |

OTHER PUBLICATIONS

Vehara, S., "Focusing-Type Optical Modulator", IEEE Jr. of Quantum Electronics", 10-1973, pp. 984–986.

Primary Examiner—William H. Punter
Attorney, Agent, or Firm—Fitzpatrick, Cella, Harper & Scinto

[57] ABSTRACT

Disclosed is a variable-focal-length lens whose focal length can be electrically controlled by applying an electric field of uniform intensity distribution to a compound lens including at least one lens formed of electrooptic crystal and varying the intensity of the applied electric field.

6 Claims, 4 Drawing Figures

VARIABLE-FOCAL-LENGTH LENS

BACKGROUND OF THE INVENTION

1. Field of the Invention

This invention relates to a lens whose focal length is variable, and more particularly to a variable focal length lens whose focal length can be varied by utilization of the electro-optic effect without any mechanical movement.

2. Description of the Prior Art

Generally, in variable-focal-length optical lens systems called zoom lenses, variation of the focal length thereof is accomplished by moving predetermined lens groups of the lens system along the optical axis thereof and varying the spacing between those lens groups. In these lens systems, however, a moving mechanism for moving the lens groups is necessary and the result is that performances such as rapid change of the focal length, compactness and reduced cost are not sufficiently satisfied, and the advent of lens systems in which those performances have been enhanced has heretofore been desired.

On the other hand, a variable-focal-length lens which is intended to eliminate the above-noted disadvantages by utilization of the electro-optic effect and which is compact and whose focal length can be rapidly changed is proposed e.g. in U.S. Pat. No. 4,466,703. An example of such variable-focal-length lens according to the prior art is shown in FIG. 1 of the accompanying drawings.

In FIG. 1, reference numeral 1 designates $KH_2PO_4$ crystal having a linear electro-optic effect (Pockels effect), reference numeral 2 denotes a first transparent electrode portion comprising a plurality of concentric annular transparent electrodes $2_1, 2_2, \ldots, 2_n$, reference numeral 3 designates a lead wire, reference numeral 4 denotes a planar second transparent electrode portion, reference numeral 5 designates a polarizing plate, and reference numeral 6 denotes a power source unit. The power source unit 6 imparts a potential to each of the annular transparent electrodes $2_1, 2_2, \ldots, 2_n$ through the lead wire 3 and applies an electric field of inclined intensity distribution to the crystal 1, thereby causing the crystal 1 to create a refractive index distribution having a lens action. Also, the focal length of said lens action is varied by varying the electric field to be applied.

However, in the variable-focal-length lens according to the prior art as shown in FIG. 1, means for applying an inclined electric field is necessary to obtain a refractive index distribution having a lens action, and this has led to complicated structure of the lens and the difficulty in manufacturing the lens at low cost. Also, the refractive index distribution thus obtained has been approximately created by the concentric annular electrodes and the reduced performance of the lens such as aberrations has been unavoidable.

SUMMARY OF THE INVENTION

It is an object of the present invention to provide a compact and rapidly operable variable-focal-length lens in which aberrations are small.

It is another object of the present invention to provide a compact and rapidly operable variable-focal-length lens which is simple in structure and inexpensive to manufacture.

The above objects of the present invention are achieved by constructing the variable-focal-length lens by a compound lens including at least one lens formed of electro-optic crystals, means for applying an electric field of uniform intensity distribution to the lens formed of electrooptic crystals, and means for varying the intensity of the electric field to be applied to thereby vary the focal length of the compound lens.

The invention will become fully apparent from the following detailed description thereof taken in conjunction with the accompanying drawings.

DESCRIPTION OF THE PREFERRED EMBODIMENTS

Figure 1:
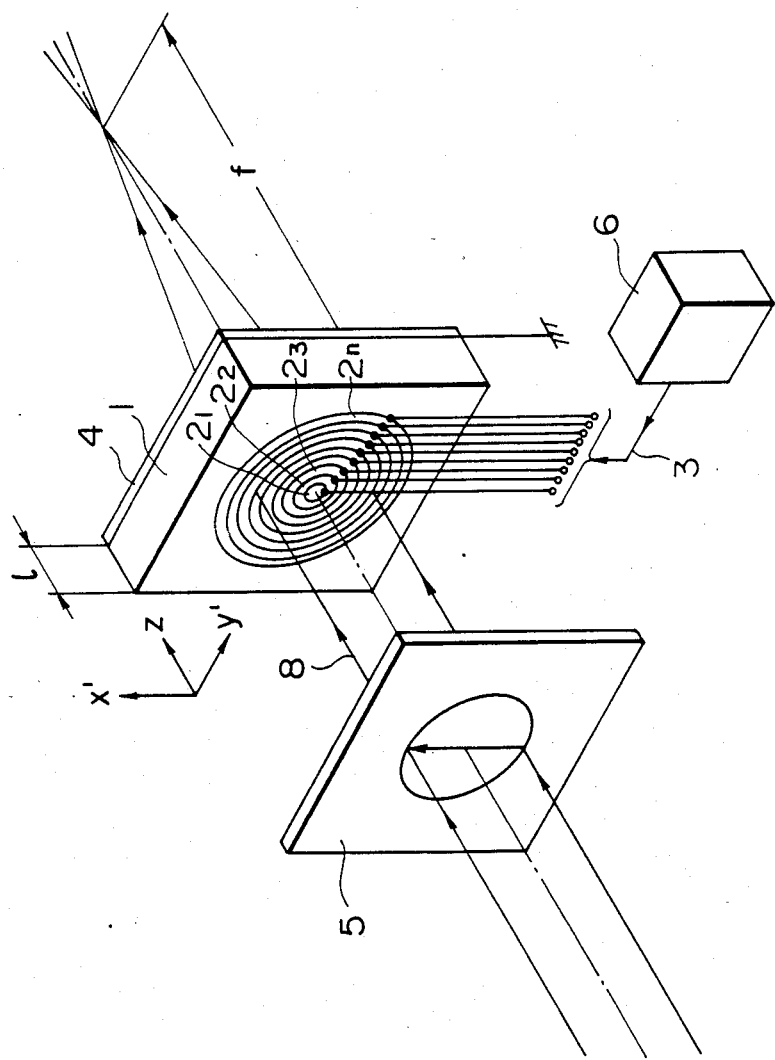
FIG. 1 is a schematic view showing a variable-focal-length lens according to the prior art which uses an electrooptic crystal.
Figure 2:
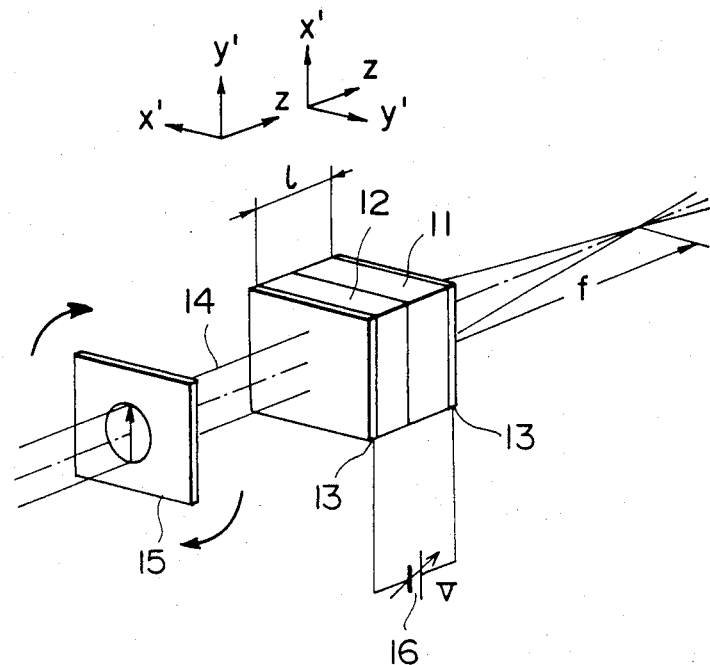
FIG. 2 is a schematic view showing a first embodiment of the variable-focal-length lens according to the present invention.

Referring to FIG. 2 which shows a first embodiment of the present invention, reference numerals 11 and 12 designate $KH_2PO_4$ crystals having a linear electrooptic effect (Pockels effect), reference numeral 13 denotes transparent electrode plates, reference numeral 14 designates a polarized light ray, reference numeral 15 denotes a polarizing plate, and reference numeral 16 designates a variable power source. The $KH_2PO_4$ crystal, as is well known, has an axis of rotatory inversion (z-axis) and two rotation axes (x-axis and y-axis), the z-axis being coincident with the optical axis. When an extraneous electric field $E_z$ is applied in the direction of the z-axis, the index ellipsoid of the crystal is varied and given by the following equation:

$$\frac{x^2 + y^2}{n_o^2} + \frac{z^2}{n_e^2} + 2\gamma_{63} E_z xy = 1 \quad (1)$$

where $n_o$ is the principal index of refraction in x and y directions, $n_e$ is the principal index of refraction in z direction, and $\gamma_{63}$ is the electrooptic constant. When $z'=z$ and the x-axis and y-axis are rotated about the optical axis by 45° to make the coordinates into x'-axis and y'-axis, the coordinates $n_{x'}$ in which the index ellipsoid cuts the x'-axis and the coordinates $n_{y'}$ in which the index ellipsoid cuts the y'-axis are respectively obtained as:

$$n_{x'} = n_o - \frac{n_o^3}{2} \gamma_{63} E_z \quad (2)$$

$$n_{y'} = n_o + \frac{n_o^3}{2} \gamma_{63} E_z \quad (3)$$

The light travelling in the direction of $z=z'$-axis through the crystals to which the electric field has been applied in z direction is permitted to be polarized only in the directions of the x'-axis and y'-axis, and the indices of refraction for the lights polarized in x' and y' directions are given by $n_x'$ and $n_y'$ of equations (2) and (3).

Accordingly, the variation $\Delta n_x'$ and $\Delta n_y'$ in index of refraction which the electric field $E_z$ applied in the direction of the z-axis imparts to the lights polarized in the directions of the x'-axis and y'-axis, respectively, are:

$$\Delta n_x' = -\frac{n_o^3}{2}\gamma_{63}E_z \quad (4)$$

$$\Delta n_y' = +\frac{n_o^3}{2}\gamma_{63}E_z \quad (5)$$

In FIG. 2, the crystal 11 and the crystal 12 are set so that with the z-axis as common, the x'-axis of the crystal 11 is coincident with the y'-axis of the crystal 12. Also, the polarizing direction of the polarizing plate 15 is set so as to be coincident with the x'-axis of the crystal 11. Accordingly, the polarized light ray 14 passing through the crystals, when the extraneous electric field $E_z$ is applied to the crystals 11 and 12, experiences the following indices of refraction in the crystal 11 and crystal 12:

$$n_{11} = n_o - \frac{n_o^3}{2}\gamma_{63}E_z \quad (6)$$

$$n_{12} = n_o + \frac{n_o^3}{2}\gamma_{63}E_z \quad (7)$$

Figure 3:
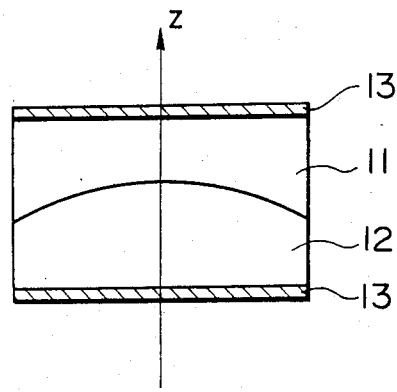
FIG. 3 is a schematic cross-sectional view of a compound lens in the first embodiment of the present invention.

FIG. 3 shows a schematic cross-sectional view of a compound lens comprised of the crystal 11 and the crystal 12 in the first embodiment. The boundary surface between the crystal 11 and the crystal 12 is symmetric with respect to the z-axis. For simplicity, assuming that the boundary surface is a spherical surface having a radius of curvature R, and when the extraneous electric field $E_z$ is applied in z direction, as previously described, the indices of refraction of the crystals 11 and 12 are $n_{11}$ and $n_{12}$ shown in equations (6) and (7), and the boundary surface becomes a refractive spherical surface and has a lens action. Also, the focal length f of this lens action is given by $$f = \frac{n_{12}}{n_{12} - n_{11}} R \quad (8)$$

and from equations (6) and (7), $$f = \left(\frac{1}{n_o^2 \gamma_{63} E_z} + \frac{1}{2}\right) R \quad (9)$$

The electric field $E_z$ is a function of a voltage V applied to the pair of parallel transparent electrode plates 13 in FIG. 2 and $$E_z = V/l \quad (10)$$

Accordingly, the focal length f is varied by varying the voltage V by the variable power source 16.

As is apparent from the foregoing description, the lens of the present embodiment using electrooptic crystals has a convergent lens action and the focal length thereof can easily be continuously varied by the control of the voltage V of the variable power source. Also, in the lens of the present embodiment, as compared with the conventional variable-focal-length lens utilizing the electrooptic effect, the electrode plates can be made into parallel flat plates of uniform transmission factor, and this leads to ease of manufacture and freedom from the influence of diffraction or the like at the electrode portion. Further, the distribution of index of refraction is obtained without complicated electric field inclining means, and this leads to improved lens performance in respect of aberrations.

In the first embodiment, the lens exhibits a convergent action, but when the polarization direction of the polarized light ray 14 is set to the direction of the y'-axis of the crystal 11, a divergent concave lens is obtainable. Of course, such a concave lens is within the scope of the present invention.

The polarizing plate 15 is disposed forwardly of the compound lens in the FIG. 2 embodiment, but it will be apparent that if it is on the light path of the light, entering the compound lens, the polarizing plate may be disposed either forwardly or rearwardly of the compound lens. The reason why the polarizer might be disposed rearwardly of the lens is that in case the light beam entering the electrooptic crystals includes components which directions of polarization are various, refracting powers conferred upon the components on the cemented surfaces of the electrooptic crystals vary with respect to the direction of polarization, so that, for example, the component in x'-axis direction be emerged as a converging light beam, while that in y'-axis direction, as a diverging light beam. The polarizing plate disposed rearwardly of the lens serves to choose one of the converging and diverging light beams. The polarizing plate 15 is not always necessary but may be omitted where the light beam entering the compound lens from a light source, not shown, is linearly polarized light and the direction of polarization is adjusted to any of the x'-axis direction and y'-axis direction of the crystals 11 and 12.

Also, in the first embodiment, by providing, on the light path of the light beam passing through the compound lens, means for varying the direction of polarization of such light beam, and changing over the direction of polarization between the x'-axis direction and the y'-axis direction of the crystal 11, there can be realized a variable-focal-length lens which can effect the change-over of the positive and the negative of the lens power at a moment. The means for thus varying the direction of polarization of the light beam includes, for example, a method of rotating the polarizing plate 15 by 90° about the optical axis in FIG. 2 by means of an unshown mechanism such as a motor or the like. Besides this, various methods would occur to mind such as a method using a combination of a polarizing plate and a Farady rotator which rotates the polarizing plane by the use of the Farady effect, a method of inserting a ½ wavelength plate on the light path as required, etc.

Figure 4:
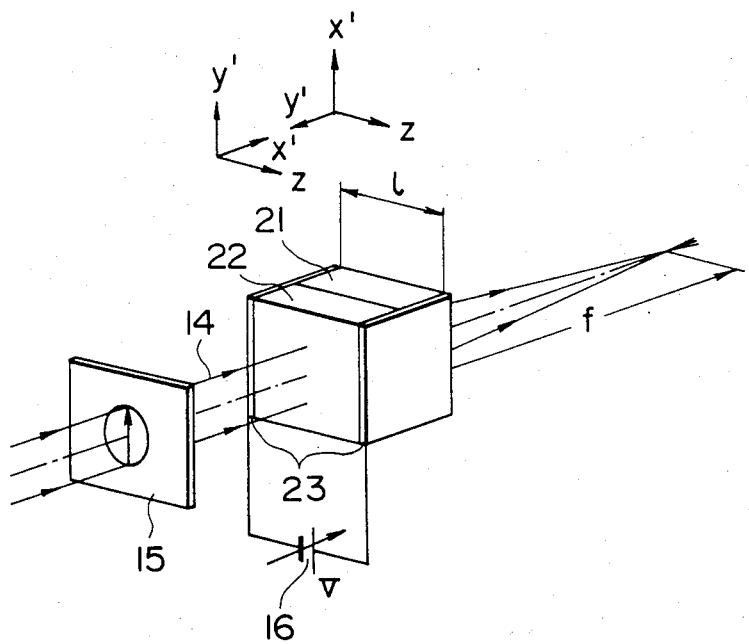
FIG. 4 is a schematic view showing a second embodiment of the variable focal length lens according to the present invention.

FIG. 4 shows a second embodiment of the present invention. In this embodiment, the direction of application of the electric field is perpendicular to the direction of travel of light. In FIG. 4, the parts common to those in FIG. 2 are given identical reference numerals and need not be described in detail. Reference numerals 21 and 22 designate $KH_2PO_4$ crystals each having a z-axis perpendicular to the direction of travel of light, and the x'-axis of the crystal 21 is set so as to be coincident with the y'-axis of the crystal 22. Reference numeral 23 denotes parallel flat electrodes, which need not always be transparent in the present embodiment. The boundary surface between the crystal 21 and the crystal 22 is symmetric with respect to the direction of travel of light and, by an extraneous electric field $E_z$ being applied in the direction of the z-axis, it exhibits a lens action convergent relative to the polarized light 14 polarized in the direction of the x'-axis of the crystal 21. The focal length f of the lens is varied by varying the voltage V by the variable power source 16. Also, a divergent concave lens is obtainable by reversing the structures of the crystal 21 and the crystal 22, that is, by setting the x'-axis of the crystal 22 and the y'-axis of the crystal 21 perpendicularly to the optical axis. In the present embodiment, no transparent electrode exists in the path of light, and this results in greater brightness of the lens than that of the lens according to the first embodiment.

A third embodiment of the present invention will now be described. In this embodiment, the $KH_2PO_4$ crystal 11 in the embodiment of FIG. 2 is replaced by another crystal having no electrooptic effect or an amorphous substance such as glass. That is, according to the present embodiment, a variable-focal-length lens is constituted by a compound lens comprising a lens formed of electrooptic crystal and a lens formed of another crystal or an amorphous substance or the like, means for applying an electric field of uniform intensity distribution to the lens formed of electrooptic crystal, and means for varying the intensity of the electric field to be applied to thereby vary the focal length of the compound lens.

In the present embodiment, when the index of refraction of said other crystal or said amorphous substance is $n_{31}$, the value of $n_{31}$ can be selected freely. That is, a convex lens can be realized by using $n_{31} < n_{12}$ relative to the index of refraciton $n_{12}$ of the crystal 12, and a concave lens can be realized by using $n_{31} > n_{12}$ and, as in the first embodiment, by controlling the electric field $E_z$ to be applied, the value of $n_{12}$ is varied in accordance with equation (7) and the focal length of the compound lens is varied. Also, by setting the value of $n_{31}$ within the range of values which $n_{12}$ assumes depending on the extraneous electric field $E_z$, there can be obtained a variable-focal-length lens in which not only the focal length but also the positive and the negative of the lens power can be changed over in accordance with the variation in intensity of the electric field.

Again in the present embodiment, as in the first embodiment, by the means for varying the polarization direction of the light beam passing through the compound lens being disposed on the light path, there can be obtained a variable-focal-length lens having a wider range of variation of the focal length, including the change-over of the positive and the negative of the lens power.

While the third embodiment has been described as an example in which the $KH_2PO_4$ crystal 11 of the first embodiment is replaced by another crystal or an amorphous substance, a similar variable-focal-length lens can also be obtained by replacing the crystal 12 by another crystal or an amorphous substance or by replacing either the crystal 21 or the crystal 22 in the second embodiment by another crystal or an amorphous substance. That is, in the present invention, if at least one lens comprising electrooptic crystal is included in the compound lens, a variable-focal-length lens can be realized by assuming a construction similar to that of each embodiment.

Again in the second and third embodiments, as in the first embodiment, the polarizing plate may be disposed either forwardly or rearwardly of the compound lens and may be omitted in some cases.

In the embodiments described above, $KH_2PO_4$ crystal having a linear electrooptic effect has been used as the electrooptic crystal, but other linear electrooptic crystals (such as $NH_4H_2PO_4$ crystal) may also be used and further, a crystal having a quadratic electrooptic (Kerr) effect such as $BaTiO_3$ may also be used within the spirit of the present invention.

Also, in the above-described embodiments, both the cemented surfaces of the electrooptic crystals which are cemented together so that their crystal-axis directions differ from each other, and the refracting surface of the lens formed of electrooptic crystal are spherical, but alternatively these surfaces may comprise non-spherical surfaces symmetric with respect to the optical axis. It is also possible to construct a one-dimensional variable-focal-length lens by making said cemented surfaces and refracting surface into cylindrical surfaces.

Further, all the above embodiments have been shown as an example in which the compound lens is constituted by two single lenses at least one of which is formed of electrooptic crystal, but a compound lens may be constructed by combining several single lenses to thereby achieve a shorter focus. Also, the number of electrooptic crystals included in such compound lens may be selected as desired, and it is also possible to enlarge the range of variation of the focal length by providing a plurality of refracting surfaces concerned in the variation of the focal length of the compound lens due to the electrooptic effect.

As described above, the present invention can achieve reduced manufacturing cost and reduced aberrations as compared with the conventional variable focal length lens utilizing the electrooptic effect.

What I claim is:

1. A variable-focal-length lens comprising:
    a lens system including at least one set of electrooptic crystals cemented together on curved surfaces thereof so that the directions of their respective axes of rotatory inversion are coincident with each other and so that the directions of their respective two corresponding rotation axes differ from each other;
    means for applying an electric field of uniform intensity distribution to said cemented surfaces of said electrooptic crystals so as to make said cemented surfaces refraction surfaces having a lens action; and
    means for varying the intensity of the electric field to be applied, to thereby vary the focal length of said lens system.

2. A variable-focal-length lens according to claim 1, wherein a polarizing plate is disposed on the light path of a light beam passing through said compound lens.

3. A variable-focal-length lens according to claim 1, wherein said means for applying an electric field comprises parallel flat electrodes attached to said electrooptic crystals.

4. A variable-focal-length lens according to claim 1, further comprising means provided on the light path of a light beam passing through said compound lens for varying the polarization direction of said light beam.

5. A variable-focal-length lens according to claim 3, wherein the intensity of the electric field to be applied is varied by controlling the voltage of a variable power source connected to said parallel flat electrodes.

6. A variable-focal-length lens according to claim 4, wherein said means for varying the polarization direction of said light beam comprises a polarizing plate and means for rotating said polarizing plate about the optical axis.

* * * * *